United States Patent [19]

Rachman et al.

[11] Patent Number: 5,687,441
[45] Date of Patent: Nov. 18, 1997

[54] FOOTWEAR'S INSOLE AND A PROCESS FOR ITS MANUFACTURE

[75] Inventors: Adi Rachman, Tel-Aviv; Emanuel Kaplan, Ramat Gan, both of Israel

[73] Assignee: Nimrod Production (1979) Ltd., Tel-Aviv, Israel

[21] Appl. No.: 580,289

[22] Filed: Dec. 28, 1995

[30] Foreign Application Priority Data

Jan. 4, 1995 [IL] Israel .......................... 112246

[51] Int. Cl.$^6$ .................. A43D 9/00; A43B 13/38
[52] U.S. Cl. .................. 12/142 R; 12/142 N; 12/146 R; 36/44
[58] Field of Search ................ 36/43, 44; 12/142 R, 12/142 N, 146 R, 146 M

[56] References Cited

U.S. PATENT DOCUMENTS

| | | |
|---|---|---|
| 354,693 | 12/1886 | Dick . |
| 1,106,986 | 8/1914 | Stucki . |
| 2,330,681 | 11/1943 | Margolin . |
| 2,748,502 | 6/1956 | Scholl . |
| 3,184,770 | 5/1965 | Phillips et al. . |
| 3,201,811 | 8/1965 | Marasco . |
| 3,314,092 | 4/1967 | Pujol . |
| 3,398,433 | 8/1968 | Vlcek et al. . |
| 3,449,844 | 6/1969 | Spence . |
| 3,488,786 | 1/1970 | Mies . |
| 3,530,489 | 9/1970 | Appleton . |
| 3,555,709 | 1/1971 | Raffaelli, Sr. . |
| 3,724,105 | 4/1973 | Weight . |
| 3,766,669 | 10/1973 | Pearsall .......................... 36/43 |
| 3,972,135 | 8/1976 | Pietraszek .......................... 36/30 R |
| 4,059,861 | 11/1977 | Santos, Jr. et al. . |
| 4,187,621 | 2/1980 | Cohen . |
| 4,270,966 | 6/1981 | Kihara . |
| 4,367,599 | 1/1983 | Diamant . |
| 4,430,811 | 2/1984 | Okada . |
| 4,581,187 | 4/1986 | Sullivan et al. . |
| 4,627,179 | 12/1986 | McElroy . |
| 4,635,385 | 1/1987 | Ogden . |
| 4,674,205 | 6/1987 | Anger . |
| 4,756,096 | 7/1988 | Meyer . |
| 4,845,861 | 7/1989 | Moumdjian . |
| 4,893,418 | 1/1990 | Ogden . |
| 4,897,937 | 2/1990 | Misevich et al. . |
| 4,908,964 | 3/1990 | Deem . |
| 4,910,886 | 3/1990 | Sullivan et al. .......................... 36/43 |
| 4,955,148 | 9/1990 | Padilla .......................... 36/43 |
| 4,987,628 | 1/1991 | Kim . |
| 5,146,697 | 9/1992 | Weiss . |
| 5,369,830 | 12/1994 | Chiarabini Bravi . |

FOREIGN PATENT DOCUMENTS

| | | |
|---|---|---|
| 87821 | 9/1988 | Israel . |
| 99341 | 8/1991 | Israel . |
| 1257890 | 12/1971 | United Kingdom . |
| 1491489 | 11/1977 | United Kingdom . |
| 1597322 | 9/1981 | United Kingdom . |

OTHER PUBLICATIONS

Pictures of Sandals G0001—G0003.
Outdoor Sport Sandals, TMT Trail Sandal, p. 15.
Sport Sandals, Technical Outdoor Sandals for Land, Water, and Everything in Between (1 page).
Cyber–System, 7 FN Aug. 12, 1996.
Wellness–Walker, Active Health for your fee with Interchangeable Footbeds, Romika (1 page).

*Primary Examiner*—Marie D. Patterson
*Attorney, Agent, or Firm*—Barnes & Thornburg

[57] ABSTRACT

The present invention relates to a footwear insole with an integral sock lining embedded therein; and to a method of making a sample comprising: preparing a board of a material selected from the group of porous and foamed cross-linked synthetic polymers; preheating the board to at least the softening point of said material; pressing the board and stamping into it a footprint shaped cavity while cooling by a stamping device having a stamping die and a stamping die bearing pressing plate; attaching a sock lining to said footprint shaped cavity; and suitably cutting the board. The sock lining may be fastened to the stamping die bearing pressing plate. Alternatively, said plate may carry an integral stamping die and the sock lining inserted after storing.

4 Claims, 6 Drawing Sheets

FOOTWEAR'S INSOLE AND A PROCESS FOR ITS MANUFACTURE

FIELD AND BACKGROUND OF THE INVENTION

The present invention is in the field of footwear and more specifically is concerned with a footwear's insole and a process for its production.

The term "insole" as used herein denotes an inner sole member fixedly attached to the outsole of a footwear.

The object of an insole is to render a person wearing the footwear a measure of comfort and specifically provide a cushioning layer of the outsole so as to absorb and dampen some of the shocks caused during walking. To fulfil its function, the insole should be resilient on the one hand, and should on the other hand be wear resistant and durable. A variety of synthetic materials were found to be suitable for manufacturing insoles having the above qualities and in many cases a loose sock lining, e.g. of leather, felt or the like, is overlaid on the insole for comfort.

Another important function of an insole is to improve the foot support and to this end there are often provided depressed or protruding zones, e.g. toe humps, an instep, a bulged surface, etc. integrally formed with the insole.

It is the object of the present invention to provide an improved insole with an integral sock lining and a method for its manufacture.

SUMMARY OF THE INVENTION

According to the present invention there is provided a footwear insole with an integral sock lining embedded therein.

In accordance with another aspect of the present invention there is provided a method of making a footwear insole, comprising:

(i) preparing a board of a material being a member selected from the group of porous and foamed cross-linked synthetic polymers;

(ii) heating the board to at least the softening point of said material;

(iii) pressing the board and stamping into it a footprint shaped cavity by a stamping device having a stamping die and a stamping die bearing a pressing plate;

(iv) attaching a sock lining to said footprint shaped cavity; and (v) suitably cutting the board.

For stamping, a press with a suitable stamping die is used and as a rule a cold press is preferred, whereby heat from the preheated board dissipates during the stamping operation with the result that the stamped insole does not deform.

In accordance with a first embodiment of the invention, the sock lining is fastened to the stamping die bearing pressing plate and constitutes itself the stamping die. In accordance with this embodiment an adhesive is applied prior to stamping to either or both mating surfaces of the sock lining and board, and as a result the sock lining is retained within a correspondingly shaped cavity impressed in the board by the sock lining.

In accordance with a second embodiment of the invention, the stamping device has an integral dedicated stamping die and the sock lining is attached after stamping.

If desired, the stamping die bearing pressing plate in accordance with the said first embodiment, or the integral stamping die in accordance with the said second embodiment, may comprise depressions or protrusions, whereby depressions and protrusions may be shaped into the insole during pressing, e.g. a toe hump, an instep and a bulged surface portion.

The invention also provides an insole for a footwear with integral sock lining made by the above method.

Still further, the invention provides a footwear fitted with an insole having an integral sock lining and made in accordance with the above method.

BRIEF DESCRIPTION OF THE DRAWINGS

For better understanding, the invention will now be described by way of example only, with reference to the annexed drawings, in which.

DESCRIPTION OF SPECIFIC EMBODIMENTS

Figure 1:
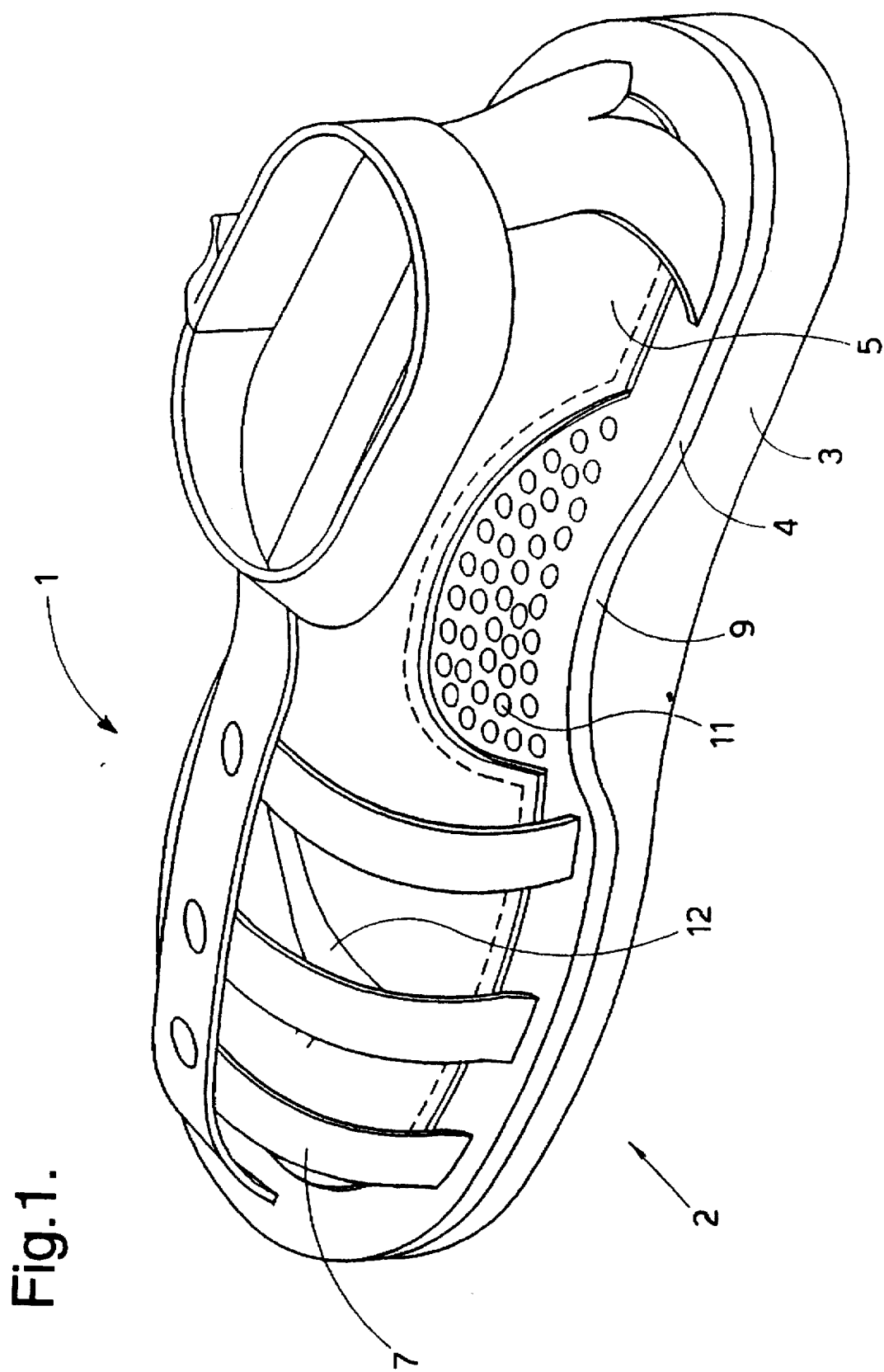
FIG. 1 is a perspective view of a footwear with an insole according to the present invention.
Figure 2:
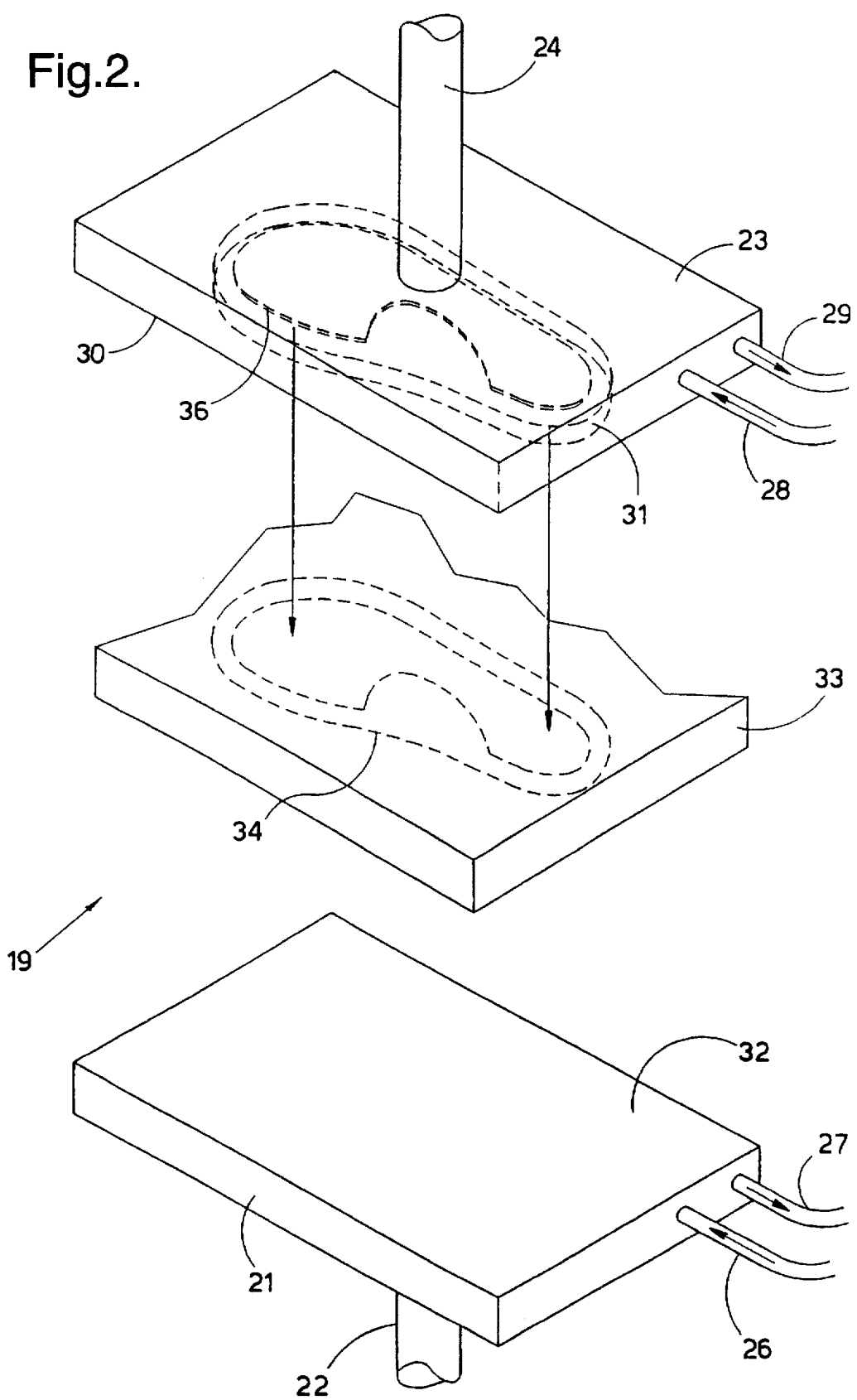
FIG. 2 is an exploded perspective view of a cold-press-type stamping device holding a board of material for the manufacture of an insole in accordance with said first embodiment of the present invention.

Turning first to FIG. 1, there is seen a sandal 1 comprising a multi-ply sole generally designated at 2 and including an outsole 3, an insole 4 and a relatively thin sock lining 5, e.g. of leather. The sandal further comprises an upper 7. As shown, sole 2 is formed with an instep 9 having a bulged surface portion 11, and with a toe hump 12.

Reference is now made to FIGS. 2 to 7 for explaining how an insole according to the present invention is manufactured.

A cold-press-type stamping device 19 has a bottom pressure plate 21 with a piston 22 and a top pressure plate 23 with a piston 24. Pressure plates 21 and 23 are associated each with a pair of flexible tubes 26, 27 and 28, 29 for the ingress and egress of cooling fluid.

The top pressure plate 23 of the cold press is formed on its bottom surface 30 with a closed loop blade 31 having the shape of the contour of outsole 3. The stroke of the pistons 22 and 24 towards each other is so designed that at the end of each stamping stroke the distance between plates 21 and 23 corresponds to the height of blade 31, whereby a board of material 33 located between the pressure plates is cut in the shape of the blade 31 as illustrated by the outer dashed line 34 in FIG. 2.

Figure 4:
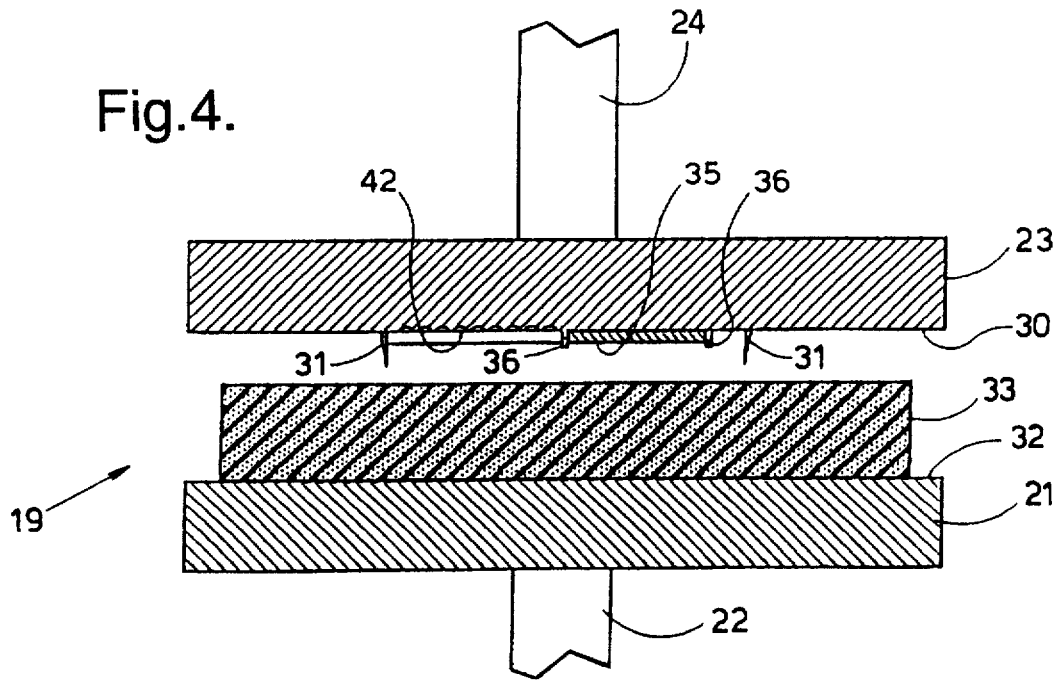
FIG. 4 is a cross-sectional view along line IV—IV of FIG. 3.

As shown in FIG. 4, a sock lining body 35 having a footprint-like shape is inserted into the stamping device 19 prior to pressing and is held by means of a closed loop gripping member 36 integral with the bottom surface 30 of the top plate 23. An adhesive is applied to the outer face of the sock lining and/or on the matching surface of the board. In this embodiment the sock lining body 35 serves as a stamping die.

Board 33, which may for example, be 15–20 mm thick, is made of a foamed cross-linked synthetic polymer material, for example, foamed polyethylene 40% cross-linked with acetyl vinyl acetate. Prior to stamping, board 33 is heated to its softening point which for the above specified material is within the range of 180° C. ±15°.

Figure 3:
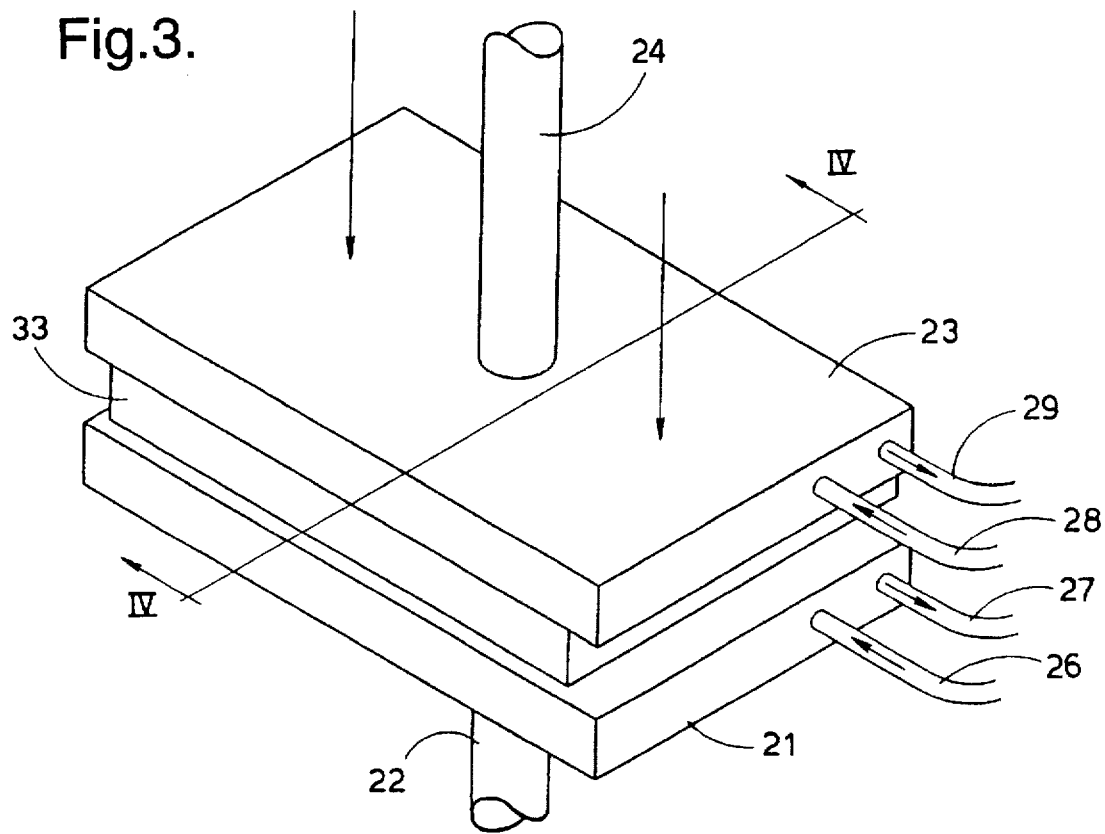
FIG. 3 is a perspective view of the cold-press-type stamping device of FIG. 2 prior to pressing.
Figure 5:
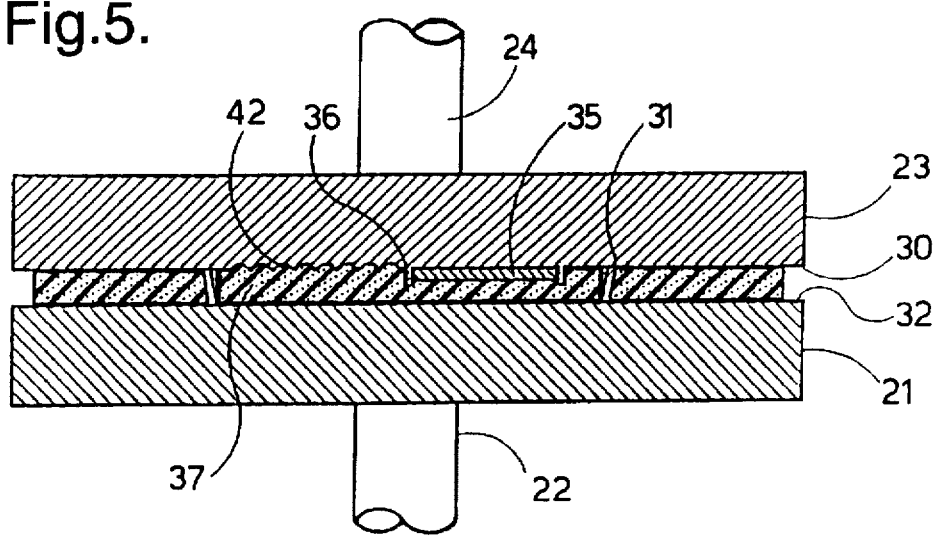
FIG. 5 is a cross-sectional view corresponding to that of FIG. 4 and showing the stamping device at the end of a stamping stroke.

After the board of material 33 is heated to its softening point, it is put in the cold-press-type stamping device 19 as shown in FIGS. 3 and 4 and the pistons 22 and 24 are put under pressure to urge plates 21 and 23 towards each other to perform a stamping stroke, the end of which is shown in FIG. 5. During stamping, board 33 is compressed to a reduced thickness of approximately 4–6 mm and the sock lining 35 impresses a footprint-shaped cavity in the board and becomes attached to the bottom thereof.

At the end of the stamping operation, the blade 31 comes to bear on surface 32 of the bottom pressure plate 21, whereby an insole shaped piece is cut out from the board and the ready-for-use insole 37 is withdrawn from the press.

Figure 6:
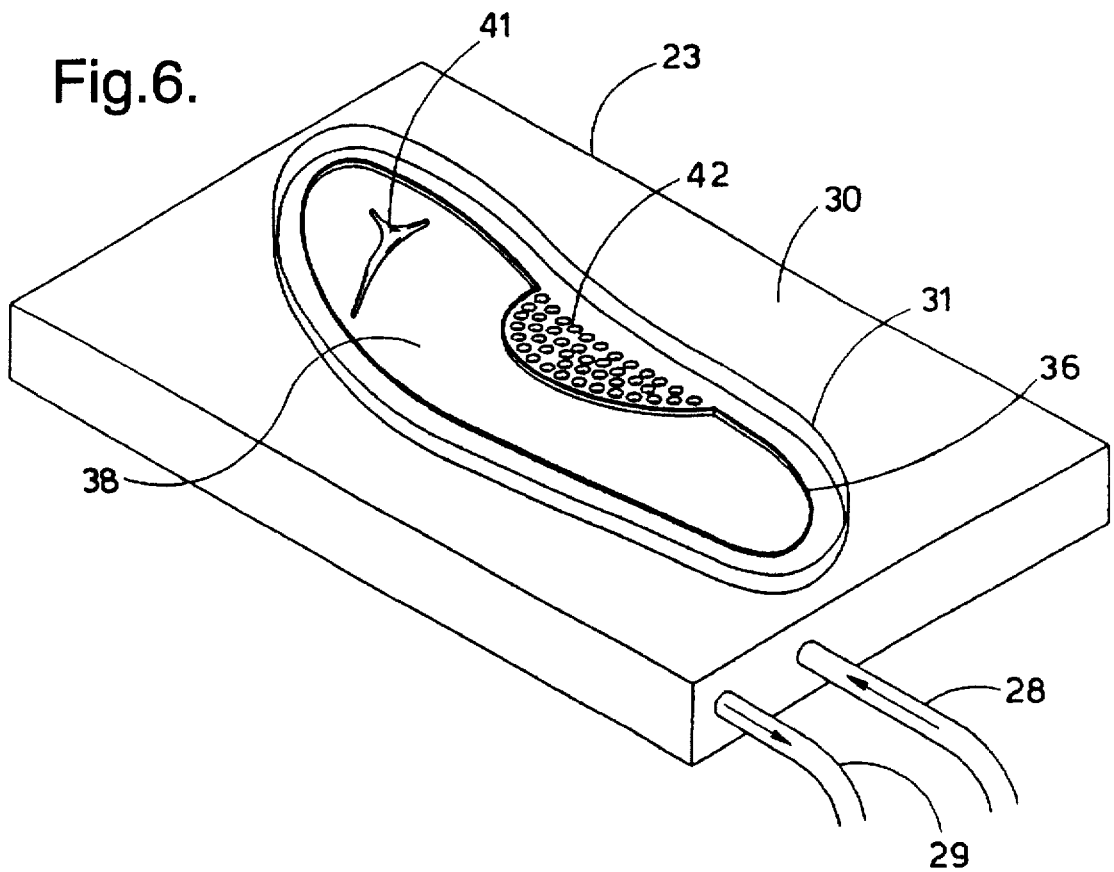
FIG. 6 shows in perspective the bottom face of a top pressure plate of the cold-press-type stamping device.

Attention is now directed to FIG. 6 for explaining how the integral bulged surface 11 and the toe hump 12 are stamped on the board during pressing. Blade 31 on surface 30 of top pressure plate 23 encloses an area die 38 which comprises negative stamping components such as indentation 41 giving rise to the formation on the insole 37 of a toe hump 12, and a section 42 with a plurality of indentations which give rise to the formation of a corresponding shaped surface on the instep portion. FIG. 6 further shows the closed-loop blade 31 extending substantially normal to the surface 30, and the gripping member 36 which is a closed-loop rib, although it may as well be non-continuous and extend only along several portions of the sock lining contour.

Figure 7:
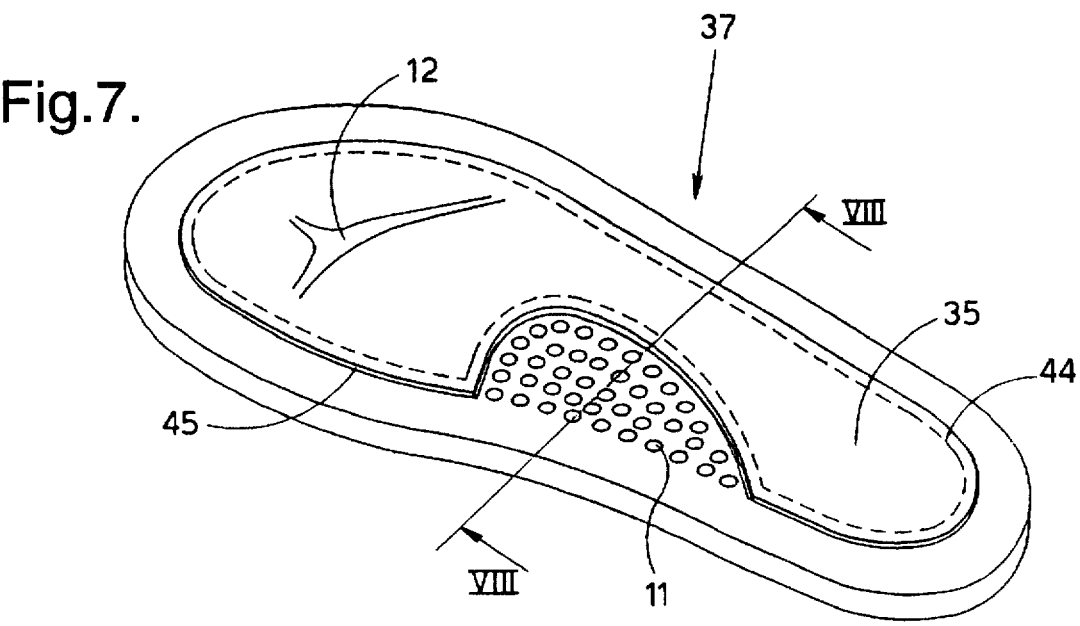
FIG. 7 is a perspective view of an insole in accordance with the present invention manufactured by the stamping device of FIGS. 2 to 6.
Figure 8:
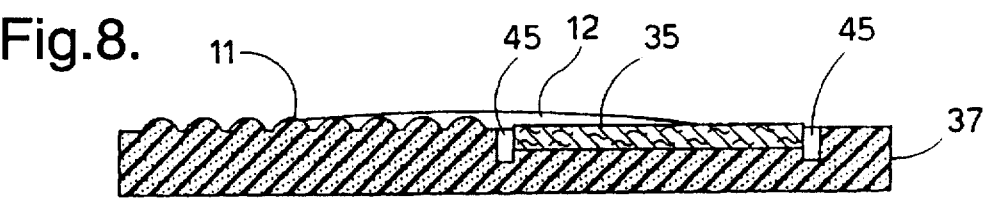
FIG. 8 is a cross-sectional view along line VIII—VIII of FIG. 7.

A finished insole 37 is shown in FIGS. 7 and 8 and it comprises an embedded sock lining 35, a toe hump 12 and a bulged surface portion 11 at the instep portion. It is also seen that in addition to adhering to the insole, the sock lining 35 is stitched along its edge 44 to the insole which serves both decorative and strengthening purposes. Insole 37 also comprises a circumferential groove 45 impressed in the insole by the closed-loop shaped gripping member 36 during the stamping process.

Figure 9:
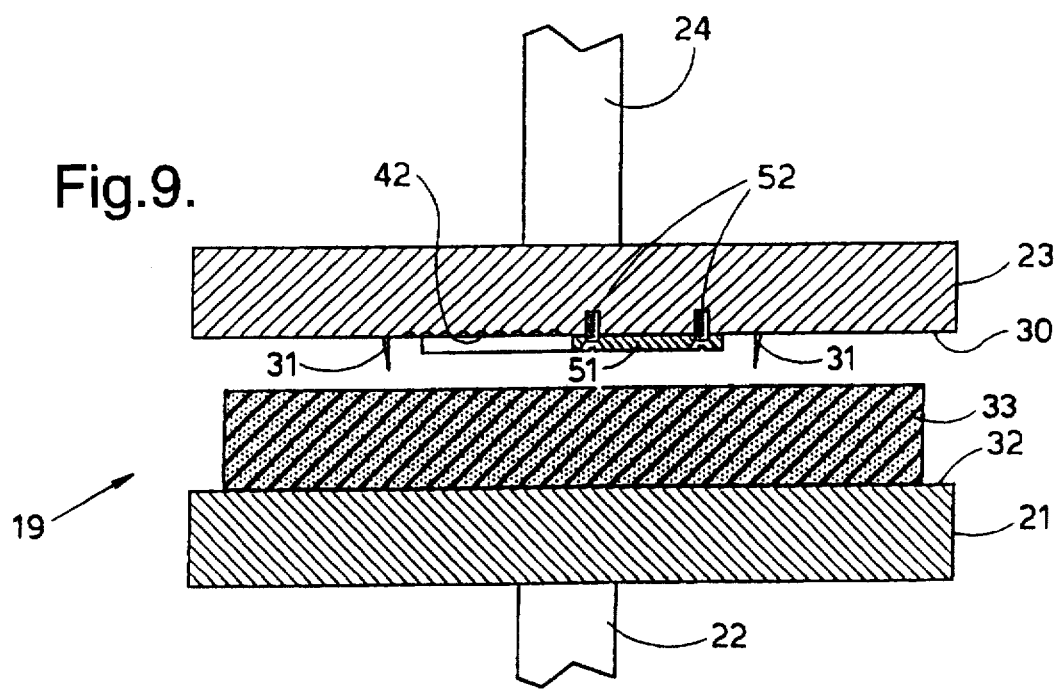
FIG. 9 is a cross-sectional view of a cold-press-type stamping device holding a board of material used for manufacturing an insole according to said second embodiment of the present invention, shown in a position prior to pressing.
Figure 10:
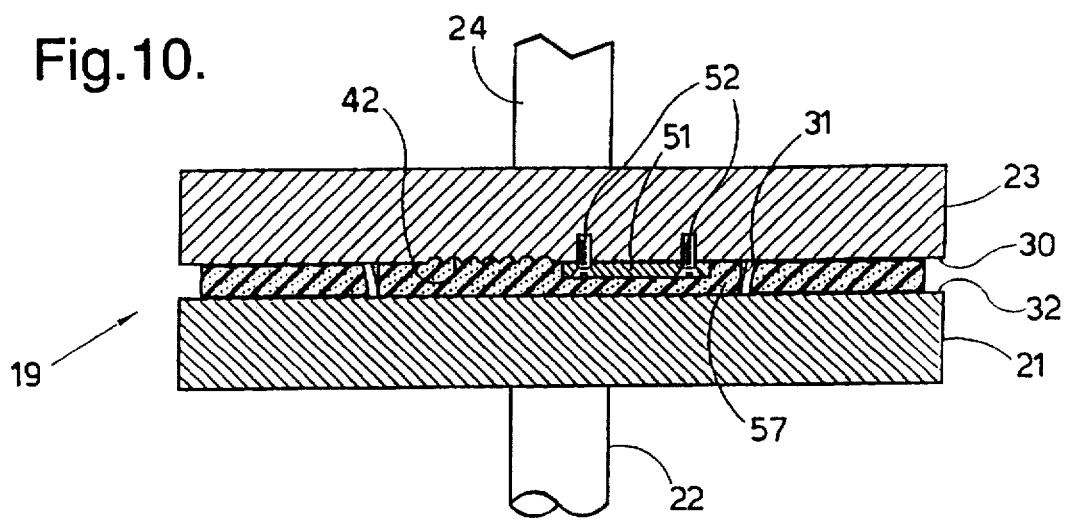
FIG. 10 is a cross-sectional view as in FIG. 9, showing the cold-press-type stamping device at the end of a stamping stroke.

Reference is now made to FIGS. 9 and 10 showing how an insole is manufactured by the said second embodiment of the present invention, those elements which are similar to those of the previous embodiment being designated with the same reference numerals.

As shown in FIG. 9, a stamping die 51 having the shape and thickness of a sock lining is attached by screws 52 to the bottom face 30 of the top pressure plate 23. Similarly as in FIG. 6, the bottom face 30 of the pressure plate 23 is provided with a negative stamping component 42 giving rise to a bulged surface portion, while a negative stamping component of a toe hump in form of a cavity is provided on the bottom face of the insert 51 (not shown).

Figure 11:
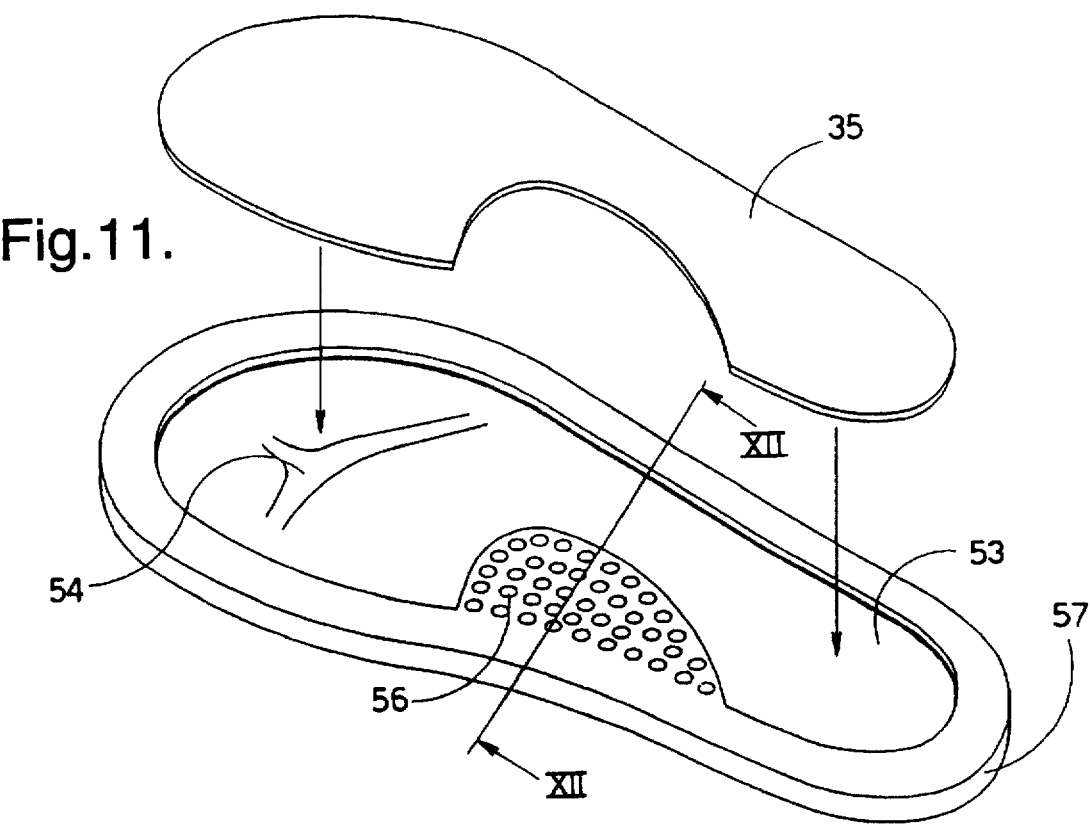
FIG. 11 is an exploded perspective view of an insole manufactured in accordance with the present invention by the stamping device of FIGS. 9 and 10.
Figure 12:
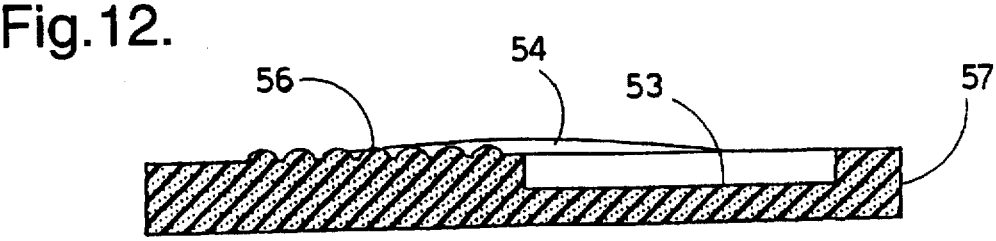
FIG. 12 is a cross-sectional view along line XII—XII of FIG. 11.

As already explained in connection with the previous embodiment and as shown in FIGS. 11 and 12, after heating the board of material 33 to its softening point, it is pressed in the stamping device 19, whereby a footprint shaped cavity 53 is stamped into the board completely with a toe hump 54 and a bulged surface portion 56, and a sole shaped piece is cut out from the board by Blade 31. After completion of the stamping stroke, the insole 57 is withdrawn from the press and an adhesive is then applied to the sock lining 35 and/or to the matching surface of the insole, whereby the sock lining is attached to the insole.

The insole according to the invention is attached to the outsole in any suitable conventional manner as known per se. If desired an instep support is integrally formed on the upper face of the outsole, whereby upon attachment, the instep elevation is transferred to the insole.

As will be readily understood by a person skilled in the art, the insole according to the invention is not limited to a specific type of footwear, nor is the invention restricted to a specific type of material and a large variety of materials may be used for manufacturing the insole and the sock lining.

We claim:

1. A method of making a footwear insole, comprising:

(i) preparing a board of material being a member selected from the group of porous and foamed cross-linked synthetic polymers;

(ii) preheating the board to at least the softening point of said material;

(iii) inserting the preheated board in a stamp device;

(iv) pressing the board and stamping into it a footprint shaped cavity while cooling by the stamping device having a stamping die and a stamping die bearing pressing plate;

(v) attaching a sock lining to said footprint shaped cavity; and (vi) suitably cutting the board.

2. A method of making a footwear insole according to claim 1, wherein the sock lining is fastened to the stamping die bearing pressing plate to constitute itself the stamping die, and is attached to the bottom of the said footprint shaped cavity during pressing.

3. A method of making a footwear insole according to claim 1, wherein the stamping die bearing pressing plate carries an integral stamping die and the sock lining is attached to the insole after stamping.

4. A method of making a footwear according to claim 1, wherein at least one of integral toe hump, an instep and a bulged surface portion are formed on the insole during the pressing.

* * * * *